Patented Oct. 21, 1947

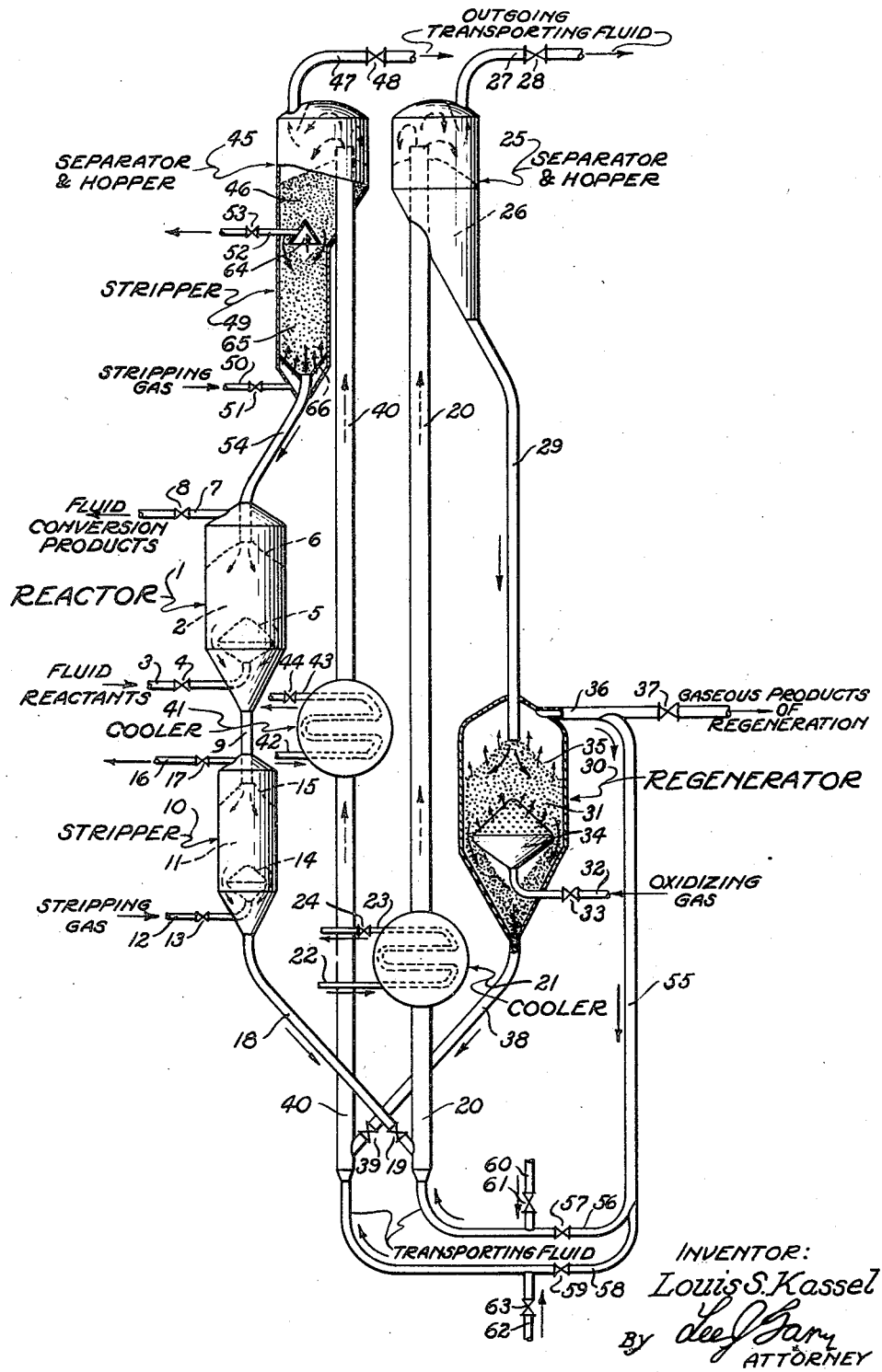

2,429,359

UNITED STATES PATENT OFFICE 2,429,359

CATALYTIC CONVERSION OF HYDROCARBONS

Louis S. Kassel, Riverside, Ill., assignor to Universal Oil Products Company, Chicago, Ill., a corporation of Delaware Application April 12, 1944, Serial No. 530,644

3 Claims. (Cl. 196—52)

This is a continuation-in-part of my co-pending application Serial Number 253,484, filed January 30, 1939, now Patent No. 2,403,375, July 2, 1946.

The co-pending application discloses a process for effecting the catalyzed conversion of fluid reactants in substantially vapor-phase employing subdivided solid particles as the catalyst and circulating the same through a reaction zone and through a separate heating zone in series. An important and novel feature of this process resides in the provision for supplying sufficient heat to the catalyst particles in the heating step and circulating them through the system at a sufficiently rapid rate that they will carry all or a substantial portion of the required endothermic heat of reaction into the reaction zone. This process is particularly directed to the endothermic catalytic conversion of hydrocarbons by reactions such as cracking, dehydrogenation and the like.

The process of the present application is also directed to the endothermic conversion of hydrocarbons in essentially vaporous or gaseous state employing particles of solid catalyst suitable for promoting or directing the desired conversion reaction. It also shares with the aforementioned parent application the feature of passing the catalyst through a circuit comprising the reaction zone and a heating zone and controlling the temperature to which it is heated and the rate at which it is circulated so that it supplies all or a substantial portion of the endothermic heat of reaction to the reaction zone.

The invention is particularly concerned with such catalytically promoted hydrocarbon conversion reactions as cracking, reforming, dehydrogenation, aromatization or dehydrocyclization and the like employing any of the well known solid catalysts which are suitable for promoting such reactions. It is further particularly directed to an operation of the type in which a relatively compact bed of the solid catalyst particles is maintained within the reaction zone and wherein the solid particles move through the bed in contact with the reactants to be endothermically converted and the resulting conversion products.

In operations of the compact moving bed type, when all or any substantial part of the heat required for conducting the reaction is supplied by the previously heated catalyst passing through the bed, there will be an appreciable decrease in the temperature of the catalyst particles as they pass therethrough. In other words, there is a temperature gradient between the top and bottom portions of the bed due to the heat given up by the catalyst to the reactants.

It is an important purpose of the present invention to provide an operation of the compact moving bed type above mentioned in which the catalyst supplies all or a substantial part of the heat of reaction in the reaction zone and in which the temperature gradient across the bed is kept relatively low.

In operations of the type in which the bed of catalyst in the endothermic reaction zone is maintained in a turbulent fluid-like condition, there will be no pronounced temperature gradient across the bed even when the temperature of the incoming catalyst is much greater, say 200 to 300° F. more than the temperature adjacent its point of removal from the bed. This is due to rapid dispersion of the incoming catalyst throughout the bed as a result of high turbulence therein. I have found that wide differences in temperature, such as commonly employed in turbulent fluid bed operations, between the catalyst entering the reaction zone and the catalyst leaving the reaction zone, cannot be tolerated in operations of the compact moving bed type without a material sacrifice in the yield and/or quality of the desired product. If the temperature of the incoming catalyst is too much above the average reaction temperature selected for best results, the reactants will be overheated in that portion of the bed adjacent the point at which catalyst is supplied thereto. If the temperature of the catalyst leaving the bed in the reaction zone is too much below the reaction temperature selected for best results, efficient conversion of the reactants will not occur in that portion of the bed adjacent the catalyst outlet and the volume of the bed must be correspondingly increased to compensate for this relatively inactive portion.

In view of the foregoing difficulties which arise from the use of a relatively compact catalyst bed in the reaction zone, as distinguished from a turbulent fluid-like bed, the invention provides a system of the compact moving bed type which is operated in the following manner. First, conversion conditions are selected for use in the reaction zone which will give satisfactory results with respect to yield and quality of the desired product with the particular charging stock to be employed. These selected conditions involve the average reaction temperature and hence the average temperature of the catalyst bed, as well as the pressure employed in the reaction zone and the space velocity. The term "space velocity" as here used may be defined as pounds of reactants contacted per hour with each pound of catalyst present in the reaction zone. The catalyst is passed to and from the bed in the reaction zone through a circuit which includes a separate confined zone of exothermic reaction. This separate confined zone may conveniently be one in which deleterious combustible contaminants accumulated by the catalyst particles in the reaction zone are burned therefrom to accomplish regeneration of the catalyst and store heat therein. The catalyst particles are passed through the circuit at such a rate that they will carry into the reaction zone all or a substantial portion, and preferably at least a major portion, of the endothermic heat of reaction without suffering a large decrease in their temperature as they pass through the bed in the reactor. In addition to this control of the rate of catalyst circulation, the temperature is controlled in that portion of the catalyst circuit which is exterior to the reaction zone so that the catalyst enters the bed in the reactor at a temperature relatively close to the average required therein for maintaining the previously selected average reaction temperature.

I have found that the temperature of the catalyst entering the bed in the reaction zone should preferably be no more than about 75° F. above the required average temperature of the bed. This difference of 75° F. is not to be considered an absolute maximum but if it becomes much greater a marked degradation in the yield or quality of the desired product, or both, will result. The tolerance with respect to temperature difference will, of course, depend to some extent upon the particular type of reaction being conducted, the nature of the hydrocarbons charged to the system, the required specifications for the product and the yields necessitated by economic considerations.

In some instances it is possible to select satisfactory operating conditions in the reaction zone which will give a deposit of combustible contaminants on the catalyst passing therethrough such that the burning of these combustibles in the subsequent zone of exothermic regeneration through which the catalyst is passed will store in the catalyst the required amount of heat for conducting the endothermic reaction. In such instances advantage may be taken of the features of the invention by simply circulating the catalyst through the system at a sufficiently high rate to maintain the desired low temperature difference between the reaction and regenerating zones so that the catalyst leaving the regenerator and entering the reactor is at a temperature relatively close to the desired reaction temperature. However, in the catalytic cracking of higher boiling hydrocarbon oils for the production of high antiknock motor gasoline or aviation base gasoline, this thermal balance between the reaction and regenerating zones can only be achieved, with most charging oils, at a relatively low conversion level (i. e., with a relatively modest yield of the desired gasoline fractions.

When the low conversion level required for this thermal balance does not give a satisfactory yield and/or quality of the desired product, the invention contemplates a choice of operating conditions in the reaction zone which will give satisfactory results with respect to yield and quality of product at the sacrifice of an inherent thermal balance. This will ordinarily result in deposition on the catalyst passing through the reaction zone of an amount of combustible contaminants to be burned in the regenerating step which will bring about the storage of more heat in the regenerated catalyst than that required for transmission therein to the reaction zone. In such instances the invention provides for abstracting this excess heat from the catalyst in that portion of its circuit through the system which is exterior to the reaction zone. To accomplish this a cooler may be provided in the path of flow of the catalyst stream passing from the reactor into the regenerator so as to reduce the temperature which would otherwise prevail in the latter zone and thus reduce to the desired value the temperature of the catalyst passing back from the regenerator to the reactor. Alternatively, or, in addition, a cooler may be provided in the path of flow of the stream of catalyst being returned from the regenerator to the reactor so as to reduce its temperature to the desired value.

The invention also contemplates the additional or alternative possibility of circulating a suitable cooling fluid through the regeneration zone in indirect contact and heat transfer relation with the catalyst undergoing regeneration therein. However, due to the complexity in the design of the regenerator which this involves, one or a combination of the two previously mentioned modes of operation is ordinarily preferred.

In certain other reactions contemplated by the invention the quantity of combustible contaminants accumulated by the catalyst in passing through the reaction zone and burned therefrom in the regenerating step may be deficient for the storage of the required amount of heat in the catalyst. This is fairly typical of such reactions as the catalytic dehydrogenation of butanes to butenes or butadienes, the catalytic dehydrogenation of butenes to butadienes and, in some instances, the catalytic retreatment or reforming of olefinic gasoline or naphtha fractions to improve their quality with respect to octane rating, blending value and/or to reduce their olefin content.

In operations of the nature last mentioned, where the heat stored in the catalyst by burning accumulated combustible contaminants therefrom results in the storage of a deficiency of heat in the catalyst for supplying all or a substantial portion of the endothermic heat of reaction, the invention contemplates supplying the required additional heat to the catalyst in that portion of its circuit exterior to the reaction zone. This may be accomplished, for example, by indirect heating of the catalyst within the regenerator or on either side (inlet or outlet) of the regenerator. However, I prefer to obtain the required additional heat and store it in the catalyst by supplying to and burning regulated quantities of fuel from an external source in the regenerating zone. Either liquid, gaseous or solid fuel may be employed for this purpose. Gaseous fuel or normally liquid fuel in vaporous or atomized state may be supplied to the bed in the regenerator with the oxidizing gas employed for supporting combustion of the catalyst contaminants and the extraneous fuel. On the other hand, liquid fuel or solid fuel, such as coal, coke or the like, in subdivided or granular form may be mixed with the stream of catalyst being supplied to the bed in the regenerator or may be separately supplied to this bed.

Regardless of which of the various alternative specific modes of operation is employed to control the temperature of the catalyst in that portion of its circuit exterior to the reaction zone and keep the temperature of the catalyst entering the reactor relatively close to the desired average temperature of the bed therein, the catalyst is in each instance circulated through the system at a sufficiently rapid rate to carry into the reactor all or a substantial portion of the endothermic heat of reaction required in this zone and to supply this required heat within the relatively narrow temperature range which is necessary for good results when employing a relatively compact bed of catalyst in the reaction zone.

As previously mentioned, the features of the invention are applicable to a wide variety of endothermic reactions. However, their application to a process for the catalytic cracking of hydrocarbon oil will serve as an adequate illustration of the operation of the process and its advantages. The following description will be directed to a process of this type.

The accompanying diagrammatic drawing is an elevational view of one specific form of apparatus in which the process of catalytic cracking may be successfully conducted in accordance with the features of the invention. Some portions of the apparatus illustrated in the drawing are shown in cross-section.

Referring now to the drawing, the apparatus here illustrated comprises a reactor 1 of substantially cylindrical form in which a relatively compact bed 2 of downwardly moving catalyst particles is maintained. The approximate upper extremity of the bed is indicated by the broken line 6. The fluid reactants to be converted, which, in this instance, comprise normally liquid hydrocarbons to be cracked, are supplied to the reactor through line 3 and valve 4, preferably in essentially vaporous state. Preheating of the oil to effect its substantial vaporization may be accomplished by passing it through a suitable externally heated coil or the like in a suitable furnace, not illustrated, or in any other convenient manner. Preferably, the oil is not preheated to a temperature much above the desired reaction temperature in order to preclude substantial thermal conversion thereof prior to its contact with the catalyst. Its temperature as it enters the reactor may be substantially below the temperature desired for effecting its catalytic conversion, in which case sensible heat, for bringing it to the desired reaction temperature, as well as endothermic heat of reaction, will be supplied by the catalyst in the reaction zone.

The reactants entering the reactor through line 3 and valve 4 are substantially uniformly distributed over the cross-sectional area of bed 2 and directed upwardly into the bed by means of a suitable inlet header and distributing member indicated at 5. In the case illustrated, the upper portion of this member is perforate and is of substantially conical form having a slope substantially corresponding to that of the catalyst bed at its upper extremity which is indicated by the broken line 6. Conversion of the reactants to the desired degree is accomplished within the reactor as they pass upwardly through bed 2 generally countercurrent to the downwardly moving solid particles of the bed. Resulting vaporous and gaseous conversion products are discharged from the upper extremity of the bed into the space provided between the latter and the upper end of the reaction vessel to be discharged therefrom through line 7 and valve 8, preferably to fractionating and recovery equipment of any suitable conventional form, not illustrated.

The active solid particles of catalyst for promoting the conversion reaction are supplied to the upper portion of bed 2 in the reactor through conduit 54, as will be later described, and pass through the bed in a general downward direction. They pass from the lower extremity of the contact zone in the reactor about the outer periphery of member 5 into the cone-like bottom section of the reactor from which they are directed downwardly in the form of a relatively compact stream or column through conduit 9 into the stripping vessel 10.

Stripper 10 is provided in the case illustrated as a zone in which valuable occluded and adsorbed hydrocarbons of a more volatile nature than the combustible contaminants to be burned therefrom in the subsequent regenerating step are removed from the catalyst so that they will not be supplied therewith to the regenerator and burned in this zone. A relatively dense or compact bed 11 of the catalyst particles, similar to bed 2 in the reactor, is maintained within the stripping vessel 10. Suitable stripping gas such as steam, for example, is supplied to bed 11 through line 12, valve 13 and the distributing member 14 which is similar in form and function to the member 5 provided in the reactor. Stripping gas and stripped-out volatile hydrocarbons are discharged from the upper extremity of bed 11, which is indicated by the broken line 15, into the space provided between the latter and the upper end of the stripping vessel and are thence discharged through line 16 and valve 17, preferably to suitable equipment for recovering the stripped-out hydrocarbons. This equipment may conveniently be the same fractionating and recovery equipment to which fluid conversion products are directed, as previously described, from the reactor. The catalyst particles pass downwardly from bed 11 in the stripping zone about the outer periphery of member 14 into the cone-like bottom section of the stripping vessel from which they are directed in the form of a relatively compact stream or column downwardly through conduit 18 and through the adjustable orifice or flow control valve 19 provided within this conduit adjacent its lower end into the gas-lift transfer line 20. This transfer line 20 is preferably, as here illustrated, a relatively straight substantially vertical conduit having an open upper end which terminates in a catalyst separator and hopper 25 disposed at a suitable elevation above the regenerator 30. In line 20 the catalyst particles are commingled with a stream of transporting fluid capable of exerting a gas-lift action on the solid particles. The transporting fluid reduces the concentration of the solid particles in line 20 and the resistance to upward flow of the transporting fluid is less in this line than that offered by the relatively dense column in line 18. Thus, the commingled stream passes upwardly through line 20 into the catalyst separator and hopper 25, which is operated at a lower pressure than that prevailing at the inlet end of line 20.

In vessel 25 the upward velocity of the stream discharged from line 20 is reduced to such an extent that all or a major portion of the catalyst particles separate by gravity from the lighter transporting fluid. The separated catalyst particles are collected in the form of a relatively compact bed indicated at 26 in the hopper-like bottom section of vessel 25. The transporting fluid is discharged from the upper portion of vessel 25 through line 27 and the pressure control valve 28.

Contaminated catalyst particles are directed from bed 26 in the catalyst separator and hopper 25 downwardly through conduit 29 in the form of a relatively compact stream or column into a relatively compact bed 31 of downwardly moving catalyst particles maintained within regenerator 30.

The interior construction of the regenerating vessel is similar in the case illustrated to that of the reaction vessel 1 and, to better illustrate this construction, the regenerator is shown in longitudinal cross-section.

Oxidizing gas, such as, for example, air or air diluted with relatively inert or non-oxidizing gas, is supplied to the regenerator through line 32 and valve 33. It is directed upwardly into bed 31 in the regenerator and substantially uniformly distributed across the bed by means of member 34 which is similar in form and function to the previously described member 5 provided in the reactor. In passing upwardly through the catalyst bed in the regenerator, the oxidizing gas burns therefrom combustible contaminants accumulated by the catalyst in the reactor, thus restoring the desired activity to the catalyst particles and storing heat in the latter. Resulting gaseous products of regeneration are discharged from bed 31 at its upper extremity, indicated at 35, into the space provided between the bed and the upper end of the regenerating vessel. These gaseous products are discharged from the regenerator through line 36 and may, when desired, be supplied, all or in part, through valve 37 to suitable heat recovery equipment, not shown, such as, for example, a waste-heat boiler, steam superheater, hot gas turbine or the like.

The regenerated catalyst particles pass downwardly from bed 31 about the outer periphery of member 34 into the cone-like lower section of the regenerator and are directed therefrom in the form of a relatively compact stream or column downwardly through conduit 38 and through the adjustable orifice or flow control valve 39 provided in this conduit adjacent its lower end into another gas-lift transfer line 40.

Transfer line 40 is preferably a relatively straight substantially vertical conduit terminating in an open upper end within another catalyst separator and hopper 45 which is disposed at a suitable elevation above the reactor. Another stream of suitable transporting fluid capable of exerting a gas-lift action on the solid particles is supplied to transfer line 40 and commingled therein with the catalyst particles from conduit 38. The manner in which the solid particles are transported through line 40 is the same as that previously explained whereby they are transported through line 20 and they pass upwardly with the transporting fluid through line 40 into vessel 45. In vessel 45 a lower pressure is maintained than that prevailing at the inlet end of line 40 and, as in vessel 25, the upward velocity of the stream entering this zone from line 40 is reduced to such an extent that all or a major portion of the solid particles separate from the lighter transporting fluid by gravity. The separated solid particles are collected in the form of a relatively compact bed indicated at 46 in the hopper-like bottom section of vessel 45. Transporting fluid is discharged from the upper portion of vessel 45 through line 47 and the pressure control valve 48.

The beds 26 and 46 of solid particles collected in the respective vessels 25 and 45 will contain some occluded and adsorbed volatiles comprising that portion of the transporting fluid which does not separate in the disengaging zones above these beds in the respective vessels. When the transporting fluid employed is of such a nature that it would be undesirable to allow its occluded and adsorbed components to pass into the succeeding reaction or regenerating zone with the catalyst from the respective vessels 25 and 45, I contemplate substantially stripping these occluded and adsorbed volatile fractions from the stream of catalyst before it is supplied to the succeeding reaction or regenerating vessel. In the case illustrated, the transporting fluid employed in transfer line 20 will do no particular harm in the regenerator and therefore no provision is made for stripping occluded and adsorbed gases being supplied from vessel 25 to the regenerator. On the other hand, assuming that the transporting fluid employed in transfer line 40 is a material which is undesirable to commingle with the conversion products discharged from the reactor, a stripping vessel 49 is provided between vessel 45 and the reactor. In the case illustrated, stripper 49 comprises an extended or depending portion of vessel 45 into which catalyst particles from bed 46 are directed about the outer periphery of member 64, provided adjacent the upper end of the stripping zone. A relatively dense or compact bed 65 of the catalyst particles is maintained in stripper 49 and stripping fluid, such as steam, for example, supplied to the lower portion of this zone through line 50 and valve 51 is directed upwardly into and distributed over the cross-section of the bed by means of the perforate cone-like member 66. The stripping fluid passes upwardly through bed 65 countercurrent to the catalyst particles descending through the bed and is discharged with stripped-out transporting gas from the upper extremity of bed 65 into the space provided within member 64 and thence discharged through line 52 and valve 53.

A relatively compact stream or column of the regenerated and substantially stripped catalyst particles is directed downwardly from the lower portion of stripper 49 through conduit 54 into the upper portion of bed 2 in the reactor to complete the catalyst circuit through the system.

To assist in controlling the temperature of the catalyst in that portion of its circuit exterior to the reaction zone, provision is made for abstracting a quantity of heat corresponding to the excess produced by burning of the catalyst contaminants in the regenerator. This is accomplished, in the case illustrated, by providing a cooler 41 in transfer line 40 for abstracting heat from the stream passing through this zone so as to reduce the temperature of the catalyst entering the reactor. Alternatively, or in addition, a cooler 21 may be provided in transfer line 20 to abstract heat from the stream passing therethrough and thus reduce the temperature of the catalyst entering the regenerator. Suitable cooling fluid is supplied to cooler 21 through line 22 and after passing through this zone in indirect contact and heat transfer relation with the stream of commingled catalyst particles and transporting fluid it is discharged therefrom at increased temperature through line 23 and valve 24. Cooling fluid for cooler 41 is supplied thereto through line 42 and after passing through the cooler in indirect contact and heat exchange relation with the stream of commingled catalyst and transporting fluid it is discharged at increased temperature through line 43 and valve 44. The cooling fluid in either instance may comprise, for example, such material as steam, oil, water, molten salt or the like.

Although when cooling of the catalyst is required I prefer to locate a cooler in transfer line 20 or in transfer line 40, or both, there are several alternative locations for each of these cooling zones which will fulfill their main objective. For example, a similar cooler or heat exchanger located in conduit 18 or in vessel 25 or in conduit 29 may be employed to reduce the temperature of the catalyst discharged from the reactor before it is supplied to the regenerator. On the other hand, a similar cooler or heat exchanger, located in conduit 38 or in vessel 45 or in conduit 54, may be employed to reduce the temperature of the catalyst discharged from the regenerator before it is supplied to the reactor. It is also possible to dispose suitable heat exchange tubes or the like in one or both of the stripping vessels 11 and 49 and circulate a suitable cooling fluid therethrough or to provide a heat exchanger or cooler in conduit 9.

Cooling of the catalyst at any of the points above mentioned in that portion of its circuit exterior to the reactor will serve in the manner previously explained as a means of temperature control which is auxiliary to the regenerator. With a cooler located in that portion of the catalyst circuit following its discharge from the reactor and preceding its introduction into the regenerator, the temperature which would otherwise prevail in the regenerating zone may be so reduced that the temperature of the catalyst returned from the regenerator to the reactor will be relatively close to the desired average temperature of the bed in the reactor. With a cooler in that portion of the catalyst circuit following its discharge from the regenerator and prior to its introduction into the reactor, the regenerator may be operated at a higher temperature than would otherwise be employed in this zone and this temperature will be reduced in the cooler to such an extent that the regenerated catalyst enters the reactor at a temperature relatively close to the average temperature desired in bed 2. It is also within the scope of the invention to operate the regenerator at some intermediate temperature and cool the stream of catalyst being supplied thereto from the reactor, as well as abstracting additional heat from the stream of catalyst being returned from the regenerator to the reactor.

Any suitable transporting fluid may be employed in the gas-lift transfer lines 20 and 40 within the scope of the invention and it is not necessary that the same transporting fluid be used in each of these lines. To mention some of the various possibilities, incoming oxidizing gas for subsequent use in supporting combustion in the regenerator may be employed as transporting fluid in line 20 in which case a conduit will be provided connecting lines 27 and 32 so that all or a portion of the transporting gas discharged from vessel 25 may be supplied to the regenerator. Oxidizing gas may also be employed as the transporting fluid in transfer line 40, in which case lines 47 and 32 will be connected by a suitable conduit for supplying all or a portion of the outgoing transporting fluid from vessel 45 to the regenerator. In either case the location of strippers 10 and 49 will remain as shown in the drawing.

Alternatively, incoming fluid reactants to be converted or outgoing fluid conversion products from the reactor may be used as transporting fluid in either transfer line 20 or transfer line 40, or both.

To use incoming reactants in line 20, the location of stripper 10 will be changed to interpose the stripping zone between vessel 25 and the regenerator, and lines 27 and 3 will be interconnected by a suitable conduit for supplying transporting gas discharged from vessel 25 into the reactor. To use outgoing conversion products as transporting fluid in line 20, a conduit connecting line 7 from the reactor with the lower portion of transfer line 20 will be provided, the stripping zone 10 will be moved to a position between vessel 25 and the regenerator, and line 27 will be connected with the fractionating and recovery equipment for the conversion products.

To use incoming reactants as transporting fluid in transfer line 40, stripping zone 49 will be moved to a location in the catalyst circuit between the catalyst outlet from the regenerator and the catalyst inlet to line 40, and lines 47 and 3 will be interconnected by a conduit for supplying transporting gas from vessel 45 to the reactor.

To use outgoing conversion products from the reactor as transporting fluid in transfer line 40, line 7 from the reactor will be connected by a suitable conduit with the lower end of transfer line 40, the location of stripper 49 will be changed to a position in the catalyst circuit between its point of discharge from the regenerator and its point of introduction into line 40, and line 47 from vessel 45 will be connected with the fractionating and recovery equipment for the conversion products.

I prefer to employ all or a portion of the gaseous products of regeneration formed in regenerator 30 as the transporting fluid in transfer lines 20 and 40. The necessary provisions for accomplishing this are illustrated in the drawing and will now be described. All or a regulated portion of the gases discharged from the regenerator through line 36 are directed through line 55 and thence through branch lines 56 and 58 in amounts controlled by the respective valves 57 and 59 into the lower portion of the respective transfer lines 20 and 40. When the process is operated in this manner and with coolers 21 and 41 provided in the respective transfer lines 20 and 40, the outgoing gaseous products of regeneration employed as transporting fluid, as well as the solid particles which they transport to the respective vessels 25 and 45 will be cooled. Thus, readily available heat in the outgoing gaseous products of regeneration may be recovered for any desired useful purpose and the transporting gas streams discharged from vessels 25 and 45 will be at a relatively low temperature. This preferred location of the coolers also makes it possible to operate the catalyst separators and hoppers at relatively low temperatures. It is, of course, within the scope of the invention to recover additional heat from the gases discharged from vessels 25 and 45 by supplying these gases to further heat recovery equipment, such as a waste-heat boiler, steam superheater, hot gas turbine or the like. Line 60, containing valve 61 and communicating with line 56, is provided for the introduction of any of the other various transporting fluids previously mentioned into line 20. Line 62, containing valve 63 and communicating with line 58, is provided for the introduction of any of the other various transporting fluids previously mentioned into line 40. It is also within the scope of the invention to employ relatively inert gas, such as, for example, steam, carbon dioxide, combustion gases or the like, from an external source as transporting fluid in line 20 or in line 40, or both, and the respective lines 60 and 62 may be employed for the introduction of such extraneous material.

Catalysts of suitable composition for promoting the various reactions contemplated by the invention are known to those familiar with the art and the composition of the catalyst employed may therefore be selected to suit requirements. The invention is more particularly concerned with the form of catalyst employed. It should preferably be in granular rather than in powdered form and I prefer to use catalyst particles of relatively small, substantially spherical shape, although other regular or irregular shapes of substantially uniform or well graded size may be employed.

The average size of the catalyst particles should be such that compact beds thereof in the contacting vessels which are several feet in depth will not offer excessive resistance to the flow of fluids through the beds and give excessive pressure drop across the beds. On the other hand, they should be sufficiently small to give efficient contact between the catalytic surface and the fluid reactants to be converted and should have a sufficiently low average density to be readily transported by gas-lift. For example, when employing a synthetically prepared substantially spherical catalyst consisting predominantly of silica and one or more metal oxides such as alumina, zirconia, magnesia and the like, I have found that an average diameter of 2 to 4 mm. will give satisfactory results.

The presence of any excessive quantity of fines which would fill the voids between the larger particles and give excessive pressure drop for the fluid through the bed or hinder flow of the relatively compact catalyst streams should be avoided. The formation of such fines by attrition of the larger particles within the system may be avoided by employing a catalyst of good structural strength. The use of substantially spherical particles or particles having well rounded edges will also help to minimize attrition. It is, of course, within the scope of the invention to provide suitable separating equipment, such as one or more centrifugal or cyclone separators, an electrical precipitator or the like, in any or all of the various vapor and gas discharge lines from the several vessels for the recovery therefrom of entrained catalyst particles. However, any catalyst carried from the vessels in these outgoing streams will be largely in the form of fine particles and preferably they are replaced by larger particles rather than being returned to the system.

One suitable method of preparing substantially spherical catalyst particles of the type which may be employed to advantage in the present process is disclosed in application Serial Number 516,392 of Glenn M. Webb and Reno W. Moehl, filed December 31, 1943.

As an example of a catalytic cracking operation, conducted in accordance with the features of the invention and in an apparatus such as illustrated and above described, the charging stock is a Mid-Continent gas oil of approximately 32° A. P. I. gravity. The catalyst employed is a synthetically prepared composite consisting essentially of silica and alumina, substantially free of alkali metal compounds and in substantially spherical form. The average diameter of the catalyst particles is approximately 3 mm., less than 5% of the catalyst within the system being below 2 mm. and above 4 mm. diameter.

The operating conditions selected for use in the reactor are an average cracking temperature of approximately 910° F., a pressure of approximately 8 pounds gauge at the vapor outlet of the reactor and a weight hourly space velocity of approximately 4. To maintain this average cracking temperature, catalyst is supplied to the bed in the reactor at approximately 975° F. and the charging stock is supplied to the bed at a temperature of approximately 800° F. The temperature of the catalyst leaving the reaction zone is approximately 862° F. and the temperature of the vaporous and gaseous conversion products leaving the reactor is approximately 950° F. The vapor pressure of the hydrocarbons entering the bed in the reactor is approximately 10 pounds gauge to give the desired outlet vapor pressure of approximately 8 pounds.

Outgoing combustion gases from the regenerator are supplied to the lower end of transfer lines 20 and 40 at a pressure of approximately 9 pounds gauge to serve as transporting fluid in these transfer lines. To accomplish this oxidizing gas is supplied to the bed in the regenerator at a gauge pressure of approximately 12 pounds. The catalyst is substantially stripped of occluded volatile hydrocarbons following its discharge from the reactor and prior to its introduction into transfer line 20. It is also substantially stripped of occluded oxidizing gas and combustion gases following its discharge from transfer line 40 and prior to its introduction into the reactor. A gauge pressure of approximately 6 pounds gauge is maintained in each of the separating vessels 25 and 45. Stripping gas is supplied to stripper 49 at a gauge pressure of approximately 8 pounds and is discharged from the upper end of the bed in the stripper at a gauge pressure of approximately 7 pounds. The pressure of the stripping gas entering the bed in stripping zone 10 is approximately 11 pounds and the gas pressure at the upper end of stripper 10 substantially corresponds to the pressure of the hydrocarbon vapors entering bed 2 in the reactor, namely, about 10 pounds gauge.

The catalyst enters the bed in the regenerator at substantially the same temperature as it leaves the bed in the reactor, namely, about 862° F. The catalyst leaves the regenerating zone at a temperature of about 1050° F. and this temperature is reduced to approximately 975° F. prior to introduction of the catalyst into the bed in the reactor. In this operation the quantity of combustible contaminants deposited on the catalyst in the reaction zone and burned therefrom in the regenerator amounts to approximately 2.5 weight percent, based on the charging stock supplied to the system. The endothermic heat of cracking is approximately 50 B. t. u.'s per pound of oil. In addition to supplying this heat to the reaction zone the circulating catalyst supplies the sensible heat required to increase the temperature of the oil vapors from approximately 800° F. to approximately 950° F. To accomplish this the catalyst is circulated through the system at a rate which corresponds to a catalyst-oil ratio of approximately 6. This ratio may be defined as pounds of catalyst supplied to the reaction zone, per pound of oil supplied thereto. Thus, with a charging stock capacity of say 1000 barrels per day or approximately 12,583 pounds per hour, the required catalyst circulation rate is approximately 75,500 pounds per hour.

An operation such as above described will yield approximately 32 volume percent, based on the charging stock, of $C_5$ and heavier gasoline fractions boiling up to 400° F. This material stabilized to a Reid vapor pressure of 10 pounds will amount to about 43 volume percent of the charging stock. In addition, approximately 7% of excess $C_4$ hydrocarbons is produced and the liquid fractions recovered, which boil above the range of gasoline, amount to approximately 54 volume percent of the charge. The stabilized 400° F. end-point gasoline may have a motor method octane number of approximately 81.

I claim:

1. In a process for the catalytically promoted endothermic conversion of hydrocarbon reactants wherein they are contacted in a confined reaction zone with a relatively compact bed of previously heated moving solid particles which comprise the catalyst and supply heat to the reactants, with a resulting appreciable reduction in the temperature of and deposition of combustible contaminants on the solid particles as they pass through the bed, the improvement which comprises passing the solid particles to and from the bed in the reaction zone through a circuit which includes a regenerating zone wherein combustible contaminants are burned from and heat is stored in the solid particles, maintaining an average temperature within said bed selected to give satisfactory results with respect to yield and quality of the desired product, regulating the conversion conditions in the reaction zone to deposit on the solid particles therein an amount of combustible contaminants which, when burned in the regenerating zone, will store in the solid particles a quantity of heat in excess of that required in the reaction zone, abstracting from the solid particles, in a cooling zone separate from the reaction and regenerating zones, a quantity of heat substantially corresponding to said excess and controlling the temperature of the solid particles in that portion of their circuit exterior to the reaction zone so that they enter the bed therein at a temperature which does not exceed said selected average by more than about 75° F., and circulating the solid particles through the system at such a rate that they supply substantially all of the endothermic heat of reaction to said reactants within the reaction zone at the relatively narrow range of temperature prevailing within said bed.

2. A process such as defined in claim 1, further characterized in that excess heat is abstracted from the solid particles as they pass from the reaction zone to the regenerating zone.

3. A process such as defined in claim 1, wherein excess heat is abstracted from the solid particles subsequent to their discharge from the regenerating zone and prior to their introduction into the reaction zone.

LOUIS S. KASSEL.

REFERENCES CITED

The following references are of record in the file of this patent:

UNITED STATES PATENTS

| Number | Name | Date |
|---|---|---|
| 2,239,801 | Voorhees | Apr. 29, 1941 |
| 2,253,486 | Belchetz | Aug. 19, 1941 |
| 2,289,329 | Prickett | July 7, 1942 |
| 2,303,717 | Arveson | Dec. 1, 1942 |
| 2,311,984 | Guild | Feb. 23, 1943 |
| 2,312,445 | Ruthruff | Mar. 2, 1943 |
| 2,326,703 | Thiele et al. | Aug. 10, 1943 |
| 2,341,193 | Scheineman | Feb. 8, 1944 |
| 2,350,730 | Degnen et al. | June 6, 1944 |
| 2,300,152 | Hemminger | Oct. 27, 1942 |
| 2,311,564 | Munday | Feb. 16, 1943 |
| 2,331,433 | Simpson et al. | Oct. 12, 1943 |
| 2,374,151 | Wolk et al. | Apr. 17, 1945 |
| 2,378,342 | Voorhees et al. | June 12, 1945 |

OTHER REFERENCES

Serial No. 434,440, Woog (A. P. C.), published June 1, 1943.